United States Patent [19]

Miura et al.

[11] 4,403,228

[45] Sep. 6, 1983

[54] INK JET PRINTING HEAD HAVING A PLURALITY OF NOZZLES

[75] Inventors: Masayoshi Miura, Kawasaki; Hiroshi Naito, Machida, both of Japan

[73] Assignee: Matsushita Electric Industrial Company, Limited, Osaka, Japan

[21] Appl. No.: 359,352

[22] Filed: Mar. 18, 1982

[30] Foreign Application Priority Data

| | | | |
|---|---|---|---|
| Mar. 19, 1981 | [JP] | Japan | 56-41195 |
| Apr. 24, 1981 | [JP] | Japan | 56-62876 |
| Dec. 25, 1981 | [JP] | Japan | 56-213473 |
| Dec. 29, 1981 | [JP] | Japan | 56-212865 |

[51] Int. Cl.[3] .......... G01D 15/18

[52] U.S. Cl. .......... 346/75

[58] Field of Search .......... 346/1.1, 75, 140

[56] References Cited

U.S. PATENT DOCUMENTS

| | | | |
|---|---|---|---|
| 4,031,563 | 6/1977 | Paranjpe et al. | 346/75 |
| 4,167,742 | 9/1979 | Head et al. | 346/75 |
| 4,272,773 | 6/1981 | Halasz | 346/140 R |
| 4,293,865 | 10/1981 | Jinnai et al. | 346/140 PD |
| 4,312,009 | 1/1982 | Lange | 346/140 PD |

FOREIGN PATENT DOCUMENTS

| | | | |
|---|---|---|---|
| 54-160242 | 12/1979 | Japan | 346/140 R |

*Primary Examiner*—Donald A. Griffin
*Attorney, Agent, or Firm*—Lowe, King, Price & Becker

[57] ABSTRACT

An ink jet printing head comprising a nozzle plate having a plurality of nozzles successively arranged in a row. An airflow chamber is in communication with the nozzles for discharging air and ink therethrough to a writing surface and connected to a source of pressurized air for causing an airstream to make sharp turns at the entry into the nozzles creating a plurality of sharp pressure gradients. A liquid chamber is located behind the airflow chamber and connected to a source of ink. A meniscus forming member is located between the air and liquid chambers for causing the ink to form at least one meniscus by surface tension over an area extending parallel with the row of nozzles. Under the influence of the pressure gradients the meniscus of the ink is contoured into a plurality of surfaces convexed toward the nozzles. Electric fields are selectively established between the nozzles and the convexed surfaces for causing the ink to extend toward the corresponding nozzles to be torn apart into droplets which are discharged through the nozzles to the writing surface.

16 Claims, 18 Drawing Figures

INK JET PRINTING HEAD HAVING A PLURALITY OF NOZZLES

BACKGROUND OF THE INVENTION

The present invention relates generally to nonimpact printing heads, and in particular to an ink jet printing head having a plurality of nozzles in which the combined effects of air pressure gradient and electric potential gradient are utilized to discharge a controlled number of jet streams of ink droplets.

The ink jet printing head shown and described in Japanese Patent Application 56-8428 filed Jan. 1, 1981 comprises an airflow chamber having a single air-liquid nozzle through which a combined stream of air and ink droplets is discharged toward a writing surface. The airflow chamber is connected to a pressurized air supply source for causing an airstream to make a sharp turn at the entry into the air-liquid nozzle, creating a sharp pressure gradient in the liquid discharge path. A liquid nozzle, connected to an ink supply, is axially aligned with the air-liquid nozzle. By the action of the pressure gradient the meniscus of ink at the liquid nozzle is convexed toward the air-liquid nozzle. An electrode is provided for establishing an electric field between the air-liquid nozzle and the convexed meniscus of the liquid to cause it to extend toward the air-liquid nozzle by electrostic attraction and to be torn apart into a droplet which is carried by the airstream and discharged through the air-liquid nozzle.

To make the operating speed of the nonimpact printer consistent with the high-speed data handling capability of the apparatus with which it is to be associated, it is desired that the printing head have a row of plural nozzles to enable simultaneous printing of dots. One approach would be to provide a plurality of liquid nozzles. For proper operation of the printer head the liquid nozzle must be aligned with one-to-one correspondence with the air-liquid nozzles with a high degree of precision. Because of close tolerances this alignment is extremely difficult to achieve.

SUMMARY OF THE INVENTION

An object of the invention is therefore to provide a multi-nozzle ink jet printing head which can be fabricated without close tolerances.

Another object of the invention is to provide a multi-nozzle ink jet printing head which is capable of responding to high frequency input signals.

The ink jet printing head of the invention comprises a nozzle plate having a plurality of nozzles successively arranged in a row. An airflow chamber, located behind the nozzle plate, is in communication with a source of pressurized air for allowing an airstream to make sharp turns at the entry into the nozzles to produce a plurality of sharp pressure gradients. A liquid chamber, connected to a source of ink, is located behind the airflow chamber. Between the air and liquid chambers is located a meniscus forming member for causing the ink to form at least one meniscus by surface tension over an area extending parallel with the row of nozzles. Under the influence of pressure gradients the meniscus of the ink is contoured into a plurality of surface portions convexed toward the nozzles. Electric fields are selectively established between the nozzles and the corresponding convexed surface portions for causing the convexed surface portions to extend toward the corresponding nozzles to be torn apart into droplets and discharged through the nozzles. Since the meniscus forming member can be easily manufactured to a high degree of precision, the alignment between it and the nozzles can be carried out without requiring highly skilled workers.

The meniscus forming member comprises a slit member having a slit extending parallel with the row of nozzles, or a material having a multitude of interstices such as porous member, mesh structure or a pile of axially extending filaments for forming a plurality of meniscuses on the surface adjacent to the airflow chamber. Since the intersticed material have a sufficient amount of power to retain the ink so that the meniscuses return to the original positions within a small period of time after ejection of ink droplets.

BRIEF DESCRIPTION OF THE DRAWINGS

The invention will be described in further detail with reference to the accompanying drawings, in which:

FIG. 6b is an axial cross-sectional view of the printing head of FIG. 6a;

DETAILED DESCRIPTION

Figure 1:
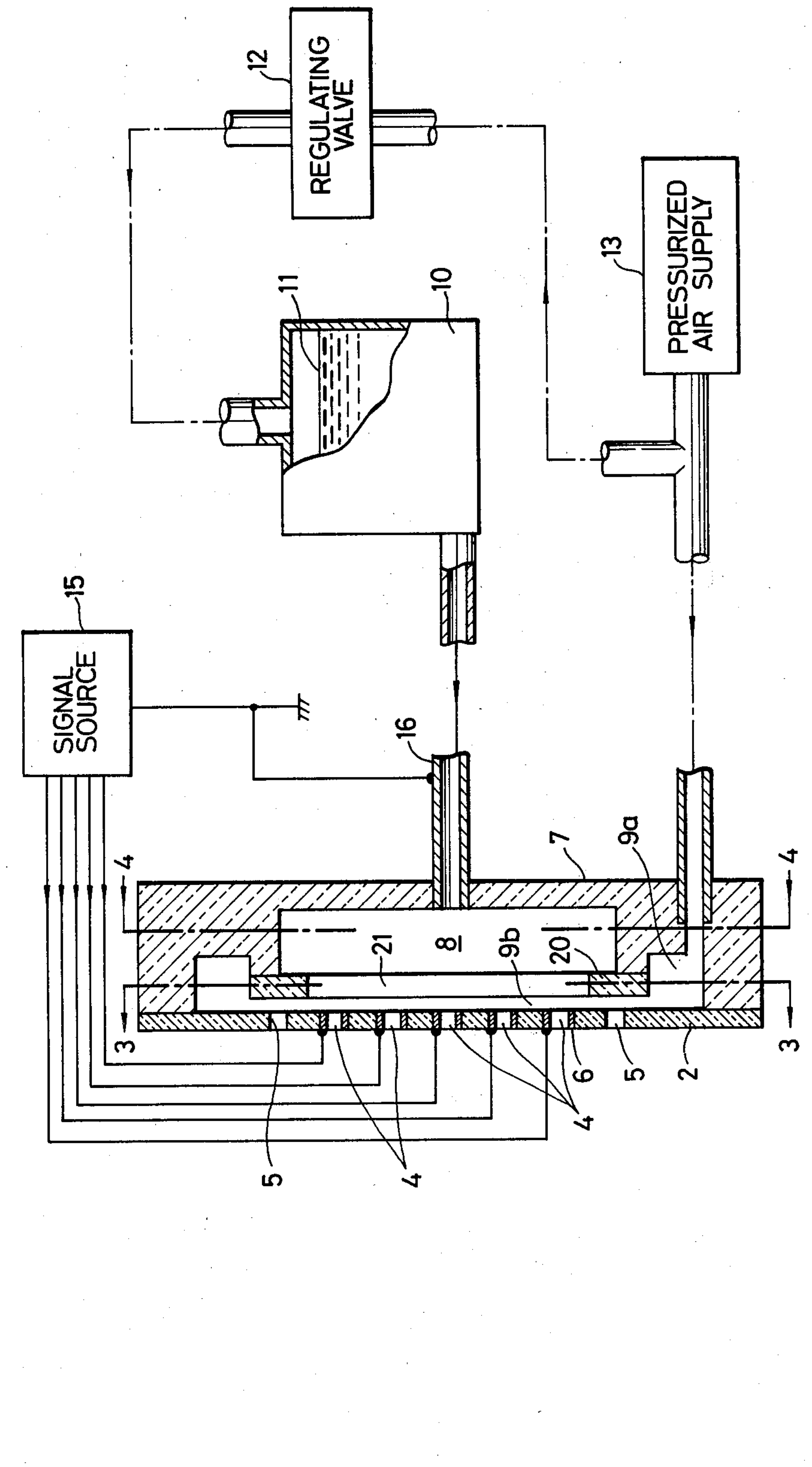
FIG. 1 is an illustration of an embodiment of the ink jet printer embodying the ink jet printing head of the present invention.

Referring now to FIG. 1, there is shown a preferred embodiment of the ink jet printer incorporating an embodiment of a multi-nozzle ink jet printing head 1 of the present invention. The printer comprises an ink supply source 10 containing ink 11 therein, a pressurized air supply source 13 for supplying compressed air to the ink supply source 10 through a regulating valve 12 and also to the ink jet printing head 1 through conduit 14.

Figure 2:
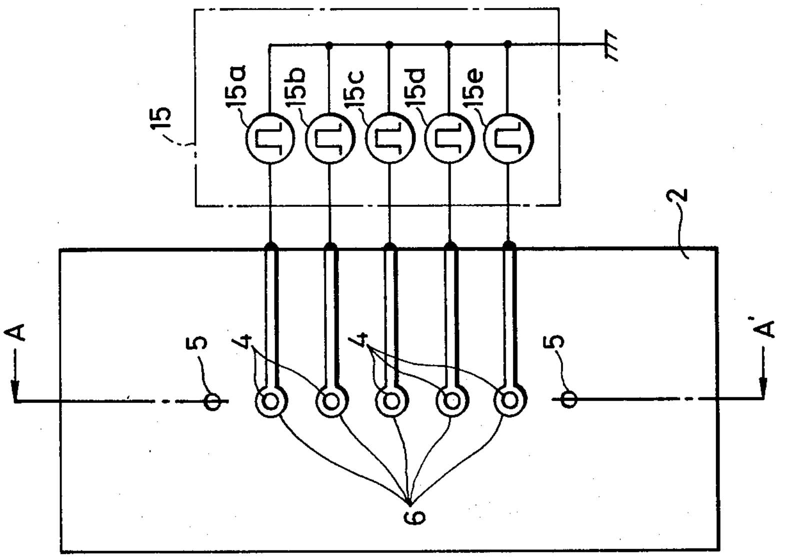
FIG. 2 is a front view of the ink jet printing head of FIG. 1.

The printer head 1 shown in FIG. 1 represents a cross-section taken along the line A-A' of FIG. 2 and comprises a front nozzle plate 2 having a plurality of main nozzles or air-liquid nozzles 4 successively arranged in a vertical row through which air and ink are ejected to a writing surface in a manner as will be described later. The inner wall of each common nozzle 4 is lined with a conductive film to form an electrode 6. The electrodes 6 are supplied with pulse signals from a signal source 15 to selectively establish one or more electric fields in each main nozzles 4. The nozzle plate 2 is secured to a rear block 7 of an insulative material which is formed with a liquid holding chamber 8 and an air chamber 9 having an outer, air reservoir chamber portion 9*a* and an inner, airflow chamber portion 9*b*. The air and liquid chambers are separated by a dividing wall or meniscus forming member 20 which, in this embodiment, takes the form of a slit member formed with a slit 21 having a width approximately equal to the diameter of each main nozzle 4, the slit 21 extending parallel with the row of main nozzles 4. The liquid chamber 8 is in communication with the ink supply source 10 via conductive tube 16 which is electrically coupled to ground. The width of the slit 21 is determined in relation to the viscosity and surface tension of the ink to render its meniscus susceptible both to air pressure gradient and electric field potential gradient. As illustrated in FIG. 2, the electrodes 5 are respectively coupled to one terminal of each of signal sources 15*a*, 15*b*, 15*c*, 15*d* and 15*e* the other terminals of which are coupled in common to ground.

Figure 4:
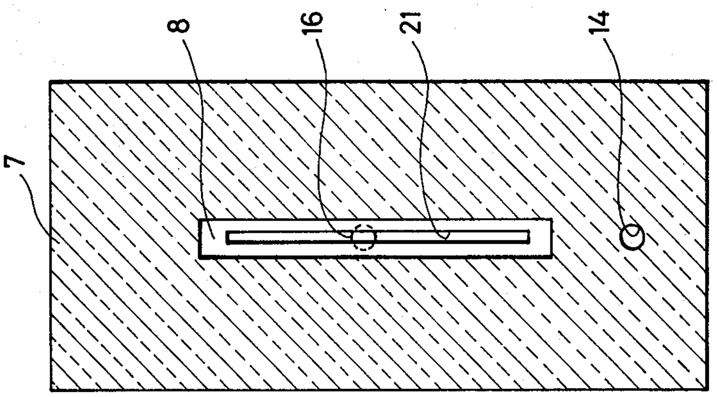
FIG. 4 is a cross-sectional view taken along the line 4—4 of FIG. 1.
Figure 3:
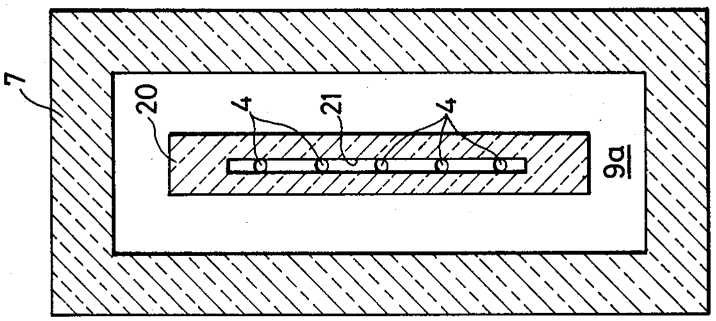
FIG. 3 is a cross-sectional view taken along the line 3—3 of FIG. 1.

As seen from FIGS. 3 and 4 the slit 21 and air-liquid nozzles 5 are aligned with each other in the axial direction of the printer head. Because of the straight opening of the slit member 20, the latter can be manufactured easily to precision and axially aligned with the vertical row of the main nozzles 4 with a relaxed tolerance.

The air supplied to the printer head 1 is buffered by the outer reservoir chamber portion 9*a* and fills the inner air chamber portion 9*b* with a laminar airflow. This airflow sharply bends at the entry into each main and auxiliary nozzle and escapes therethrough to a writing surface. This sharp bending of airstream produces a high air pressure on the meniscus of the ink at the slit 21 creating an air pressure gradient which increases as a function of distance from the slit 21.

Figure 5:
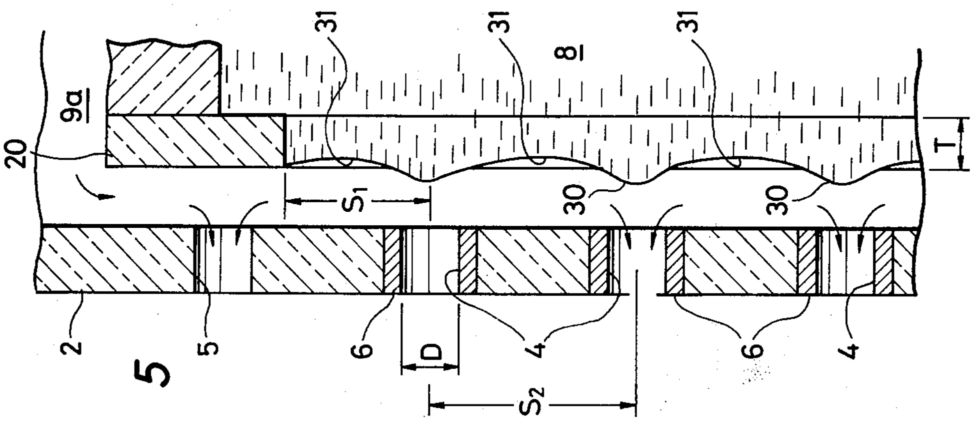
FIG. 5 is an enlarged view of an upper portion of the printing head of FIG. 1.

The regulating valve 12 is manually adjusted in the absence of signals to the electrodes 6 so that the liquid pressure in the slit 21 is statically balanced against the combined force of the air pressure acting on the meniscus on the slit 21 and its surface tension until the meniscus is contoured by virtue of the pressure gradients into a plurality of forwardly convexed surfaces 30 each located directly behind each main nozzle 4 with rearwardly concaved surfaces 31 formed between them as clearly shown in FIG. 5. When electric potential is applied to a given electrode the convexed meniscus portion behind that electrode is electrostatically charged with respect thereto and is pulled forward. Since the electric field has an increasing potential gradient toward the nozzle plate and tends to concentrate on the forward end of the convexed meniscus, the pulling force increases as the meniscus is extended forward. Therefore, in response to the application of a potential the portion of ink just behind the biased electrode is rapidly pulled forward and torn apart into a droplet under the combined effects of electrical potential gradient and air pressure gradient. The droplet is carried by the airstream and expelled at a high speed through the electrically biased nozzle to a recording sheet.

In a practical embodiment of the invention, the air pressure acting on the meniscus is preferably in a range from 0.03 to 0.2 kilograms/$cm^2$. With the air pressure of this range, an air speed of about 40 to 150 meters/second is attained at the discharge end of each nozzle. A preferred value of the diameter of each air-liquid main nozzle 4 is approximately 250 micrometers or less.

Two air nozzles 5 are additionally disposed one on each end of the vertical row. The purpose of the air nozzles 5 is to permit the portion of air above and below the row of main nozzles to escape through nozzles 5 so that all the main nozzles have an equal air pressure distribution. Otherwise, the main nozzles disposed on the end of the row would have a pressure distribution differing from the distribution of other main nozzles, resulting in a skewed trajectory of the ink droplets from such nozzles. In a preferred embodiment of the present invention, the spacing S1 between each end of the slit 21 and the main nozzle adjacent thereto is greater than twice the diameter D of the main nozzle 4 and is greater than one-half the center-to-center spacing S2 between adjacent main nozzles.

Consider now the effect of interference between adjacent main nozzles. When a given convexed surface portion is pulled forward in response to the application of a potential to the associated electrode, it tends to drag some of the liquid from adjacent convexed surfaces causing them to sag in convexity. This is considered to be attributed partly to the shortage of ink to be replenished.

To this end, the axial dimension or depth T of the slit 21 is preferably less than 3/2 of the center-to-center spacing S2. With this quantitative relationship the flow resistance to the liquid in the slit 21 can be minimized increasing the amount of ink to be replenished from the rear chamber 8 to a satisfactory level.

Figure 6B:
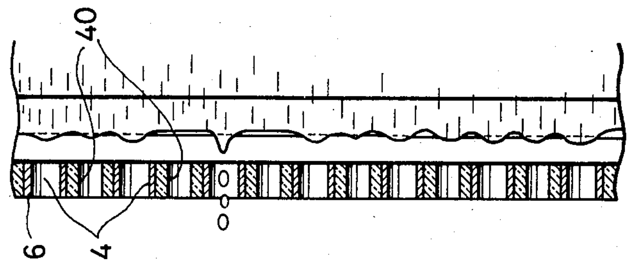
Figure 6A:
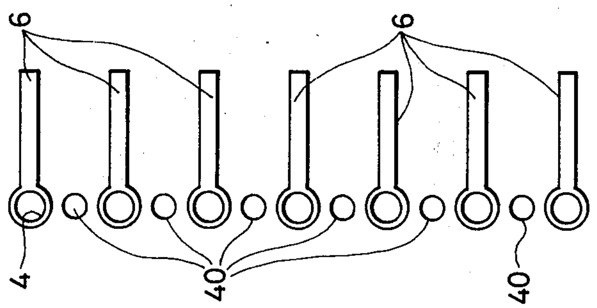
FIG. 6a is a front view of a modified printing head which is useful for preventing adjacent air pressure distributions from interfering with each other.

The problem of liquid shortage in the slit 21 could also be eliminated by forming a plurality of auxiliary air nozzles 40 in the nozzle plate 2 so that each auxiliary nozzle 40 is disposed between adjacent main nozzles 4 as illustrated in FIGS. 6*a* and 6*b*. The provision of such air nozzles causes the portions of meniscus behind them to be contoured into forwardly convexed surfaces as shown in FIG. 6*b*. Assume for purposes of explanation that a potential is applied to the electrode 6*a* of air-liquid nozzle 4*a* in FIG. 6*b*, the convexed meniscus portions behind adjacent air nozzles 40*a*, 40*a* will sag to a flat level. It will be seen that air nozzles 40*a*, 40*a* act as a buffer between adjacent main nozzles 4. Each of the additional air nozzles 40 has preferably a diameter smaller than the diameter of the air-liquid nozzle 4.

Figure 7:
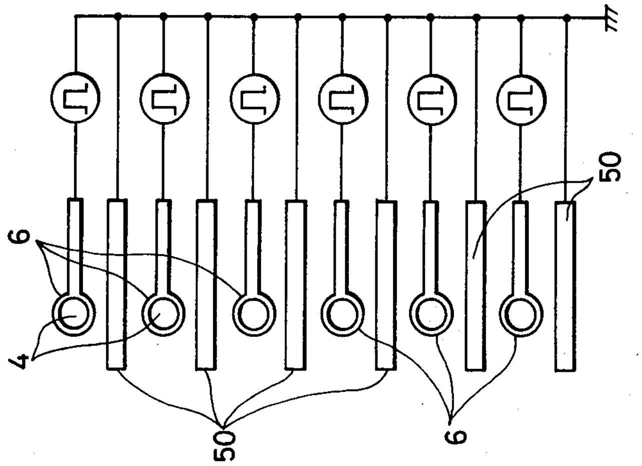
FIG. 7 is a front view of a further modified printing head useful for preventing adjacent electric fields from interfering with each other.

Mutual interference also occurs between adjacent electrical fields. This can be avoided by forming a plurality of additional elongated shielding electrodes 50 as shown in FIG. 7, each of the shielding electrodes 50 being located between adjacent main electrodes 6 and electrically connected together to ground.

Figure 8:
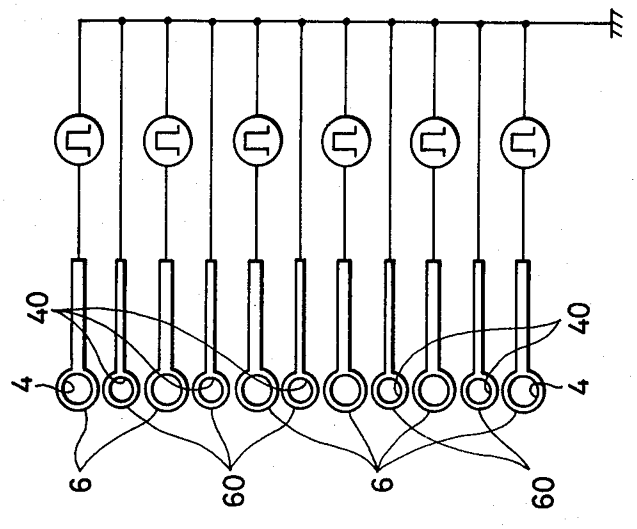
FIG. 8 is a front view of a printing head which combines the concepts of FIGS. 6 and 7.

The interference in air pressure and field distribution could be eliminated by an embodiment shown in FIG. 8. This embodiment combines the arrangements of FIGS. 6*a*, 6*b* and 7 so that auxiliary air nozzles 40 have their inner walls lined with cylindrical shields electrodes 60 which are electrically coupled to ground.

Figure 9:
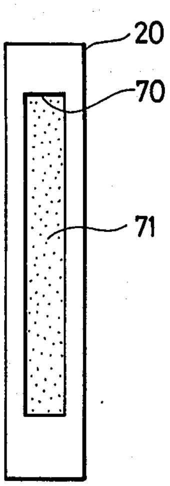
FIG. 9 is an illustration of a modified form of the slit member of FIG. 1.
Figure 10:
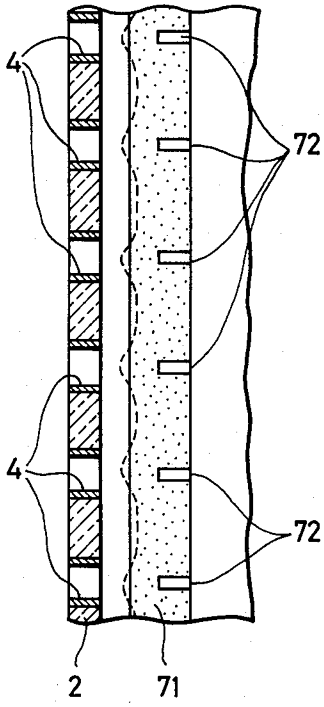
FIG. 10 is a cross-sectional view of the modified slit member having a plurality of additional electrodes embedded in the porous member.

The alignment problem described previously is further alleviated by modifying the meniscus forming member 20 in a manner as shown in FIG. 9. In this modification the member 20 is provided with a slit 70 having a width greater than the width of the slit 21 of the previous embodiment. A porous member 71 is fitted in the slit 70 and impregnated with the ink supplied from the rear chamber 8. In the same manner as described above the ink contained in the porous member 71 is contoured into a plurality of undulating surface portions under the influence of the air pressure distribution across the front surface of the porous member 71. In a preferred embodiment, the porous member 71 is provided with a plurality of conductive members 72 in positions corresponding to the main nozzles 4 as shown in FIG. 10. These conductive members are coupled to ground to serve as a common electrode for concentrating electric fields.

For proper operation of the printing head of the invention, it is desirable that the meniscus of the ink return rapidly to the original position when the electrical potential is removed. The rapid return property of the liquid's meniscus affects the minimum turn-off time of the printing head and hence the maximum operating frequency of the printer head.

Figure 12:
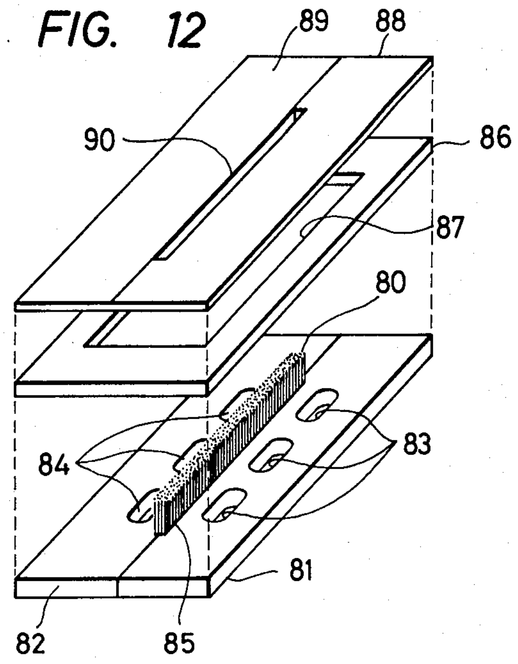
FIG. 12 is a perspective view illustrating the details of the slit member of FIG. 11.

For this purpose, a pile of filaments 80, either formed of natural or artificial fibers, is fitted in the slit 21 of the slit member 20. One particular material that is satisfactory for filaments is glass fiber. The liquid in the rear chamber 8 passes through the interstices between the filaments 80 to the front surface of the pile to form a multitude of tiny meniscuses forming a general surface which undulates in accordance with the air pressure variations in the airflow chamber 9*b*. The filaments 80 have the effect of increasing the surface tension of the ink retained in the slit 21 to stabilize the surface undulation of the meniscus within a short period of time after removal of the applied potential. The slit member 20 of this embodiment is fabricated in a manner as shown in FIG. 12 by comprising a pair of base members 81 and 82 each having a plurality of apertures 83, 84, the base member 81 being formed with an elongated recess 85 which defines a slit with the adjacent edge of the base member 82 to hold therein the lower ends of the filaments 80. A frame 86 having an aperture 87 is mounted on the base members to allow passage of ink through the apertures 83, 84 and through the aperture 87 to the sides of the upper part of filaments 80. On the frame 86 is disposed a pair of filament holding members 88 and 89, the holding member 89 being formed wth a recess 90 identical to the recess 85 to define a slit with the adjacent edge of the holding member 89 to hold the upper part of the filaments in the recess 85 so that the front surface of the pile of filaments 80 is made flush with the upper surface of the holding members 88 and 89.

Figure 11:
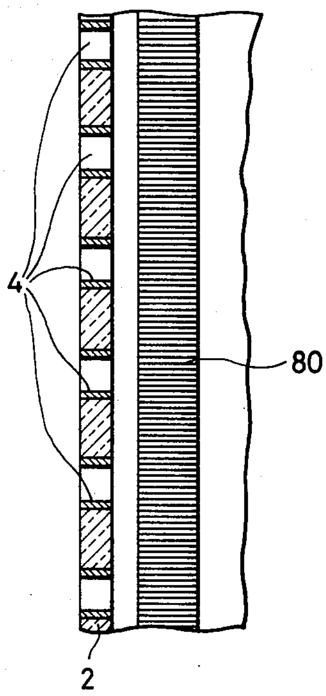
FIG. 11 is an illustration of a further modified form of the slit member.
Figure 13A:
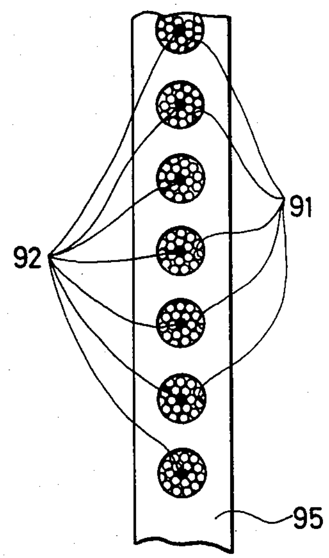
FIGS. 13a and 13b are illustrations of a still further modification of the slit member of FIG. 1.
Figure 13B:
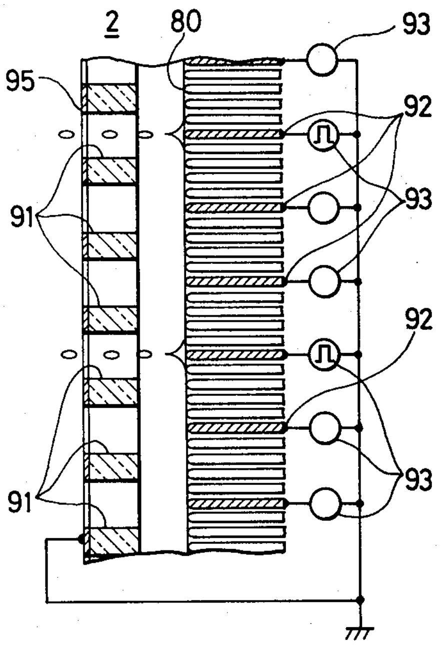

A modification of the embodiment of FIG. 11 is illustrated in FIGS. 13*a* and 13*b*. In this modification the individual electrodes 6 are replaced with a thin elongated electrode 95 having a plurality of apertures 91 each encircling each main nozzle 4 and the filament pile 80 is provided with a plurality of conductive filaments 92 which are located in positions corresponding to the centers of the apertures 91 to produce intensified electric fields. The conductive filaments 92 are respectively coupled to the individual signal sources 93 to serve as individual signal electrodes, while the electrode 90 is coupled to ground to serve as a common electrode.

Figure 14:
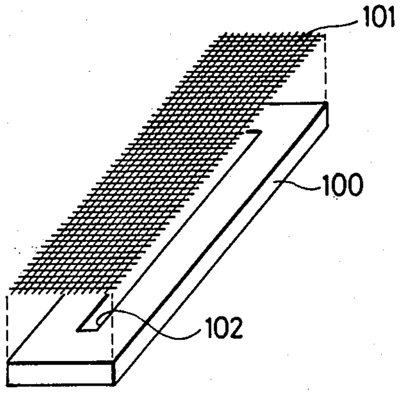
FIG. 14 is an illustration of a still further modification of the slit member.

An alternative embodiment is further shown in FIG. 14 in which the slit member 20 comprises a frame 100 and a mesh 101 attached thereto. The mesh structure 101 is in contact with the ink in the opening 102 to serve as a meniscus forming surface on which a multitude of meniscuses are formed and retained with a holding power sufficient to return the meniscus to the original position after ejection of droplets. The opening 102 has a width greater than the diameter of the main nozzle 4 to facilitate alignment with the latter.

Figure 15:
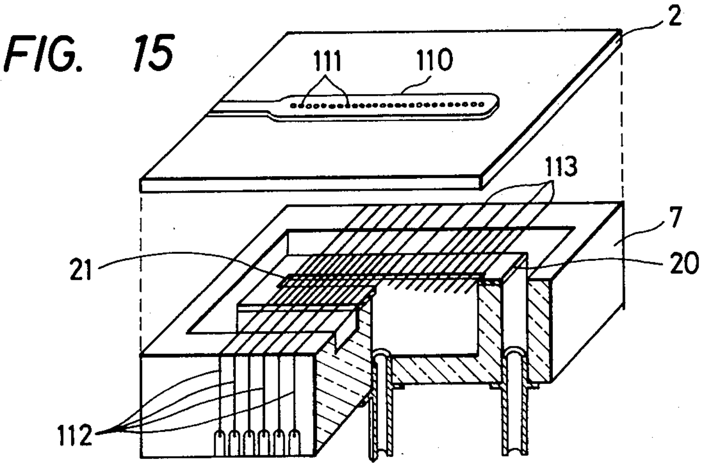
FIG. 15 is an illustration of a further embodiment of the invention.
Figure 16:
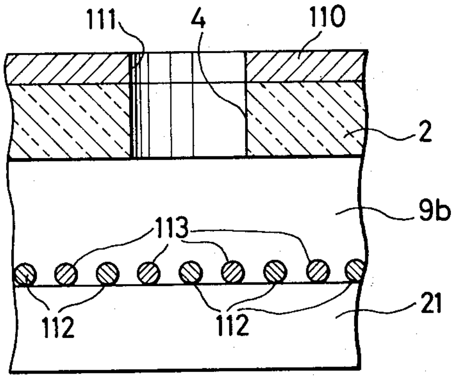
FIG. 16 is a partial cross-sectional view of the embodiment of FIG. 15.

It is desirable that the number of individual electrodes should be made as large as possible to increase the operating speed of the printer head. FIGS. 15 and 16 illustrate an embodiment in which the number of electrodes is greatly increased. To the nozzle plate 2 is attached a common electrode 110 of elongated configuration having a plurality of apertures 111 corresponding to the main nozzles 4 formed in the underlying plate 2, the electrode 110 being coupled electrically to ground. A first group of conductive filaments 112 and a second group of nonconductive filaments 113 extend transverse to the slit member 20 from opposite sides of rear block 7 so that filaments of each group are interleaved one-for-one with each other. The conductive filaments 112 connect to respective terminals to which individual signals are applied. It is preferable that there is a plurality of conductive filaments 112 that corresponds to each main nozzle 4 as shown in FIG. 16. The nonconductive filaments 113 not only provide the effect of insulation between conductive filaments 112 and but produce a combined effect of increasing the surface tension of the liquid with the conductive filaments 112 to improve the The turn-off characteristic of the printing head. The filaments 113 could also be formed of a conductive material. In this case the filaments 113 are coupled to ground to serve as a shield between adjacent conductive filaments 112.

What is claimed is:

1. An ink jet printing head comprising a nozzle plate having a plurality of nozzles successively arranged in a row, an airflow chamber communicating with said nozzles for discharging air and ink therethrough and connected to a source of pressurized air for allowing an airstream to make sharp turns at the entry into said nozzles creating a plurality of sharp pressure gradients, a liquid chamber connected to a source of ink, meniscus forming means located between said chambers for causing the ink to form at least one meniscus over an area extending parallel with said row of nozzles, said meniscus having a plurality of surface portions convexed toward said nozzles under the influence of said pressure gradients, and means for selectively establishing a plurality of electric fields between said nozzles and the corresponding convexed surface portions for causing said surface portions to extend toward the corresponding nozzles to be torn apart into droplets and discharged through said nozzles.

2. An ink jet printing head as claimed in claim 1, wherein said meniscus forming means comprises a slit member having a slit extending parallel with said row for holding the ink therein by surface tension.

3. An ink jet printing head as claimed in claim 2, wherein said slit has a depth smaller than 3/2 of the spacing between adjacent ones of said nozzles.

4. An ink jet printing head as claimed in claim 2, wherein said field establishing means comprises:

a common electrode secured to said nozzle plate and having a plurality of apertures corresponding to said nozzles and coupled to a reference potential; and a plurality of conductive filaments successively arranged in side-by-side relation on said slit member traversing said slit and coupled respectively to signal sources.

5. An ink jet printing head as claimed in claim 4, further comprising a plurality of insulative filaments traversing said slit and successively arranged in side-by-side relation on said slit member so that said conductive filaments and said insulative filaments are interleaved with each other, said conductive and insulative filaments lying on a plane on which said ink forms its meniscus.

6. An ink jet printing head as claimed in claim 4, further comprising a plurality of second conductive filaments traversing said slit and successively arranged in side-by-side relation on said slit member so that said first and second condutive filaments are interleaved with each other, said second conductive filaments being couled to a reference potential to serve as a shield between adjacent ones of said first conductive filaments, said first and second conductive filaments lying on a plane on which said ink forms its meniscus.

7. An ink jet printing head as claimed in claim 1, wherein said meniscus forming means comprises means forming a multitude of interstices to produce a multitude of meniscuses forming a general surface having a plurality of surface portions respectively convexed toward said nozzles under the influence of said pressure gradients, 8. An ink jet printing head as claimed in claim 7, wherein said interstices forming means comprises a porous member.

9. An ink jet printing head as claimed in claim 7, wherein said interstices forming means comprises a pile of axially extending filaments.

10. An ink jet printing head as claimed in claim 9, wherein said filaments comprise a pile of insulative filaments and a plurality of conductive filaments disposed between portions of said insulative filaments in positions corresponding to said nozzles.

11. An ink jet printing head as claimed in claim 7, wherein said interstices forming means comprises a mesh structure.

12. An ink jet printing head as claimed in claim 1, wherein said nozzle plate is further provided with a pair of additional air vent nozzles respectively located adjacent to opposite ends of said rows of the first-mentioned nozzles but remote from the center of the row for exclusively discharging air.

13. An ink jet printing head as claimed in claim 1 or 12, wherein the opposite ends of said meniscus forming means are spaced respectively from the opposite ends of said row a distance greater than twice the diameter of said first-mentioned nozzles and greater than ½ the spacing between adjacent ones of said first-mentioned nozzles.

14. An ink jet printing head as claimed in claim 1, wherein said field establishing means comprises a plurality of electrodes each surrounding each of said nozzles, and wherein said nozzle plate is formed with a plurality of air vent nozzles each being located between adjacent ones of the first-mentioned nozzles for exclusively dicharging air to prevent said pressure gradients from interfering with each other.

15. An ink jet printing head as claimed in claim 14, further comprising a plurality of additional electrodes each encircling said air vent nozzles and connected to a reference potential to prevent said electric fields from interfering with each other.

16. An ink jet printing head as claimed in claim 1, wherein said field establishing means comprises a plurality of electrodes each surrounding each of said nozzles, further comprising a plurality of additional electrodes each located between adjacent ones of the first-mentioned electrodes and connected to a reference potential to prevent said electric fields from interfering with each other.

* * * * *

UNITED STATES PATENT OFFICE
CERTIFICATE OF CORRECTION

Patent No. 4,403,228 Dated September 6, 1983

Inventor(s) Masayoshi MIURA; Hiroshi NAITO

It is certified that error appears in the above-identified patent and that said Letters Patent are hereby corrected as shown below:

Cover page, [Item 30], following the fourth-listed foreign priority application, insert a fifth line as follows:

--February 18, 1982 [JP] Japan............ 57-25312--.

Signed and Sealed this

*Twenty-second* Day of *November 1983*

[SEAL]

*Attest:*

GERALD J. MOSSINGHOFF

*Attesting Officer* *Commissioner of Patents and Trademarks*